United States Patent [19]

Stockton

[11] Patent Number: 4,597,467
[45] Date of Patent: Jul. 1, 1986

[54] FOUR-WHEEL DRIVE CLUTCH MECHANISM

[75] Inventor: Thomas R. Stockton, Ann Arbor, Mich.

[73] Assignee: Ford Motor Company, Dearborn, Mich.

[21] Appl. No.: 553,338

[22] Filed: Nov. 18, 1983

[51] Int. Cl.⁴ .............................................. B60K 17/34
[52] U.S. Cl. ..................................... 180/248; 180/233; 192/36; 192/41 S; 192/44; 192/47
[58] Field of Search ............... 180/248, 245, 246, 247, 180/249, 244; 192/20, 35, 36, 41 S, 44, 47; 74/650

[56] References Cited

U.S. PATENT DOCUMENTS

| | | | |
|---|---|---|---|
| 2,684,140 | 7/1954 | Warn | 192/47 |
| 2,851,115 | 9/1958 | Buckendale | 180/248 |
| 2,884,101 | 4/1959 | Warn | 192/44 |
| 3,055,471 | 9/1962 | Warn | 192/36 |
| 3,124,972 | 3/1964 | Seliger et al. | 74/650 |
| 3,173,309 | 3/1965 | Seliger | 74/650 |
| 3,300,002 | 1/1967 | Roper | 180/249 |
| 3,476,226 | 11/1969 | Massey | 192/44 |
| 3,581,597 | 4/1970 | Reiersgaard | 74/650 |
| 3,700,082 | 10/1972 | Schwab | 74/650 |
| 3,935,753 | 2/1975 | Williams | 74/650 |
| 4,119,168 | 10/1978 | Fogelberg | 180/248 |
| 4,185,723 | 1/1980 | Kelbel | 192/36 |
| 4,230,211 | 10/1980 | Goto et al. | 192/35 |
| 4,493,387 | 1/1985 | Lake et al. | 180/248 |
| 4,499,980 | 2/1985 | Kaninski et al. | 192/35 |

*Primary Examiner*—John J. Love
*Assistant Examiner*—Mark C. Dukes
*Attorney, Agent, or Firm*—Frank G. McKenzie; Donald J. Harrington

[57] ABSTRACT

A four-wheel drive mechanism for a front-wheel drive vehicle includes a final drive mechanism driven from the output shaft of the engine, which transmits power through a differential to the front drive wheels, and through a gear set and an overrunning clutch to the rear axleshafts. The gear ratio of the gear set is established so that the outer race of the clutch is driven slower than the speed of the front drive wheels so that the rear axleshafts in normal driving conditions are not driven. If, however, the front wheels slip relative to the road surface, the clutch will transmit power to the rear axleshafts or to one rear axleshaft that turns slower than the rear axleshaft. A roller cage retains the rollers and is biased by a spring into contact with a drag surface that is selectively connected to and disconnected from the casing of the drive mechanism. A solenoid, engaged whenever the shift mechanism of the transmission is moved to the neutral position, disengages the drag connection between the cage and casing. The cage springs bias the cage to a neutral position where the rollers are moved out of contact with the ramp surfaces of the clutch.

1 Claim, 7 Drawing Figures

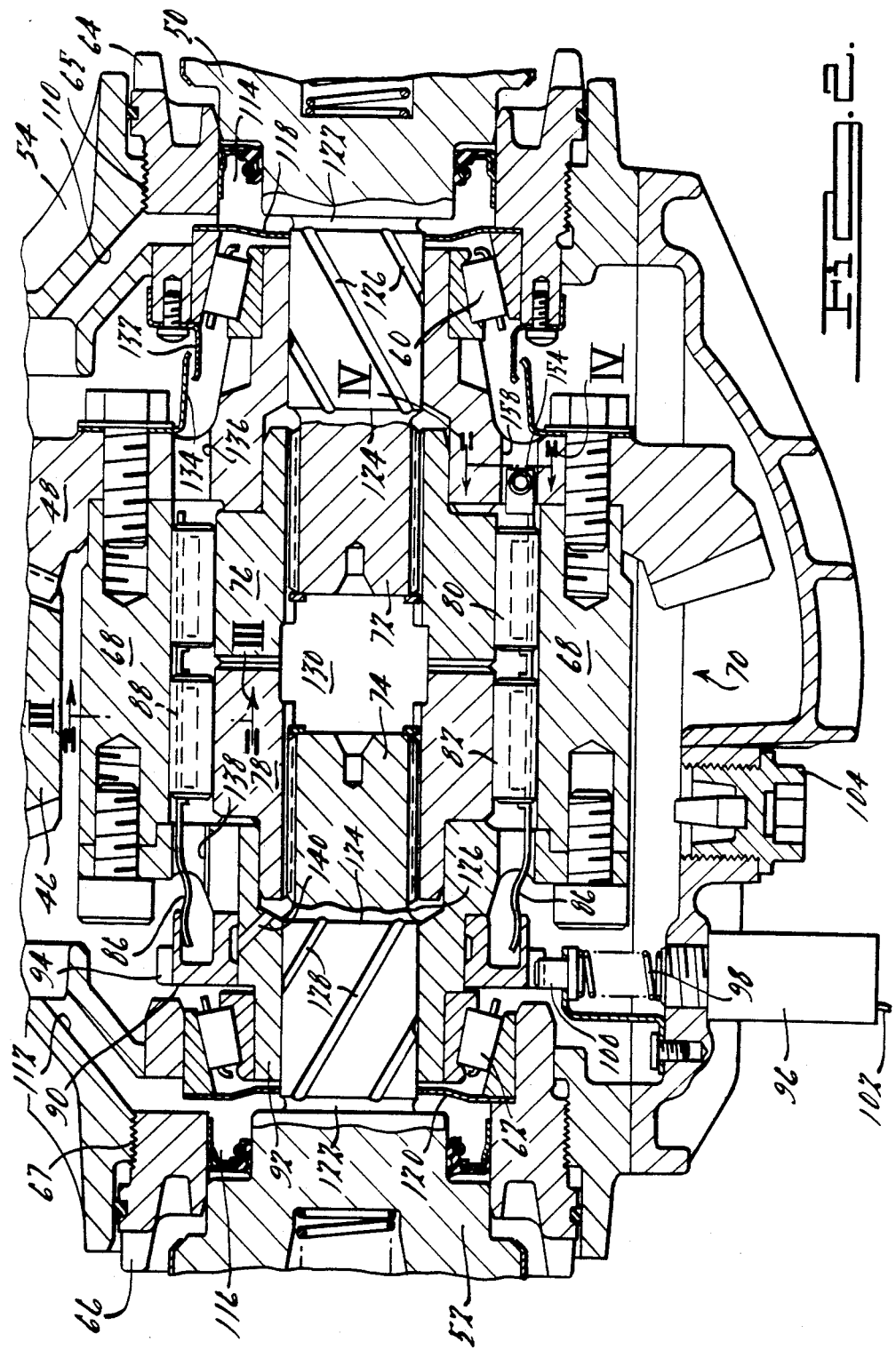

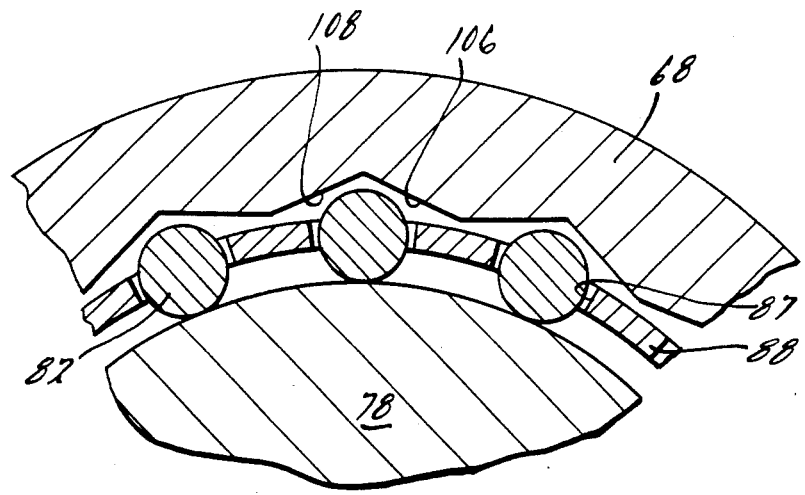
FIG. 3C.
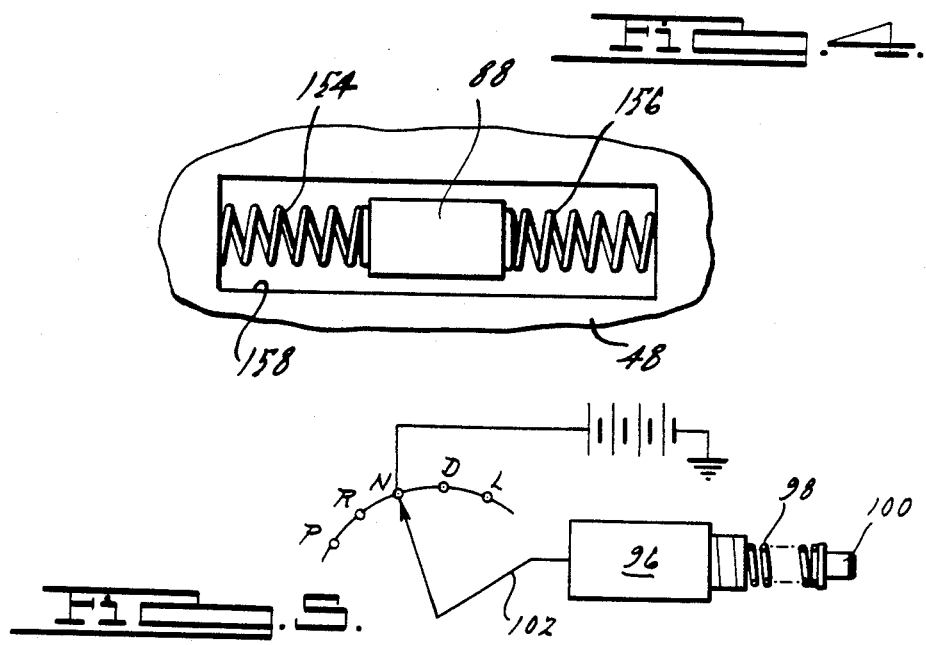
FIG. 4.
FIG. 5.

FOUR-WHEEL DRIVE CLUTCH MECHANISM

BACKGROUND OF THE INVENTION

1. Field of the Invention

The present invention relates generally to the field of four-wheel drive power transmission systems for vehicles, particularly to such systems that transmit power to the first or two sets of wheels while the wheel sets have the same speed, and to the other set of wheels when the speed of the first wheel set exceeds that of the other wheel set.

2. Description of the Prior Art

Drive mechanisms have been devised that transmit power to only one set of wheels when the four wheels of the vehicle are rotating at nearly the same speed. However, when the driven wheels begin to overrun, the nondriven wheels are drivably connected to the transmission and become driven, whereas the driving wheels in this condition are no longer supplied with power. Sometimes this action is done by providing the nondriven set of wheels with an overrunning clutch and by gearing the clutch such that it becomes engaged when a predetermined speed differential between the driving and nondriven wheels occurs. This requires that the overrunning clutch be manually locked in order to obtain four-wheel drive when the vehicle is driven in reverse or when engine braking is required. Other systems use a conventional differential to allow the front and rear axelshafts to deliver power while rotating at different speeds. These systems generally require a manual lock-up device to prevent excessive wheel spin when encountering surfaces on which the wheels may slip. It is desirable in the operation of a four-wheel drive vehicle that the driven wheels should be driveably disconnected from the transmission when the wheels are not driven in order to reduce drag on the engine and to avoid unnecessary wear.

In four-wheel drive systems, power is transmitted to a set of driven wheels and power is transmitted to another set of wheels only when the first set spins relative to the road surface. Usually it accomplishes this result by providing gearing between the driven and nondriven axleshafts that permits an element of a roller clutch in the driveline to overrun unless this slippage occurs. This overrun results because the gear set has a gear ratio that permits one element of the clutch to rotate at a preselected different speed than that of the nondriven wheels. When slippage of the driven wheels occurs, this speed differential is overcome and power is transmitted to the usually nondriven wheels. It is possible in systems of this type, after a forwardly driven vehicle is stopped and then driven in reverse, that the rear wheels will transmit power through the overrunning clutch and the gear set to the driven wheels. When this occurs, the speed of the driven wheels tends to exceed the speed of the usually nondriven wheels because of the effect of the gear ratio of the gear set that connects the axle. But because the wheels are of the same size and their linear speeds must be the same in straight ahead driving, the driven wheels are forced to scrub and slide across the road.

SUMMARY OF THE INVENTION

In an automotive power transmission system in which the front axleshafts are normally driven directly from the transmission output shaft through a differential, the rear axleshaft can be driven instead of the front axleshafts. According to the present invention, whenever slippage of the front drive wheels occurs, an overrunning clutch rotatably mounted coaxially with the rear axleshafts transmits power to normally nondriven axleshafts. The clutch has an outer race wherein multiple sets of ramp surfaces are formed, the outer race being driven through the gear set from the transmission output shaft. The gear set is sized to produce a gear ratio such that the speed of the outer race of the clutch is slower than the rotational speed of the front and rear wheels when the vehicle is driving straight ahead and without wheel slippage. Each of the rear axleshafts is driveably connected to an associated inner race of the clutch. First and second sets of rollers located between the outer surface of the inner races and the inner surface of the outer race are movable into and out of contact with the ramp surfaces on the outer race. A cage has multiple sets of apertures formed on its surface within which the rollers of the clutch are retained and positioned relative to the ramp surfaces of the outer race. The cage is biased by spring arms into contact with a surface of the clutch that is held selectively against rotation. The sliding action of the clutch on this fixed surface produces a drag force that locates the cage and rollers with respect to the ramp surfaces such that power is transmitted through the clutch to the normally nondriven wheels of the vehicle when slippage of the driven wheels occurs. A ground connector is selectively connectable to and disconnectable from the casing of the drive mechanism and provides a surface on which the cage spring arms are continuously held in contact. The drive mechanism further includes an electrical solenoid having a compression spring that biases a pin intp contact with teeth formed on the outer surface of the ground connector thereby holding the connector fast to the casing. When the solenoid is energized, as it is whenever the shift selector is moved to the neutral position, the pin of the solenoid disengages the ground connector from the casing and in this condition the cage and roller assembly is free to assume a neutral position with respect to the ramp surfaces of the outer race. The cage is biased by compression springs to the neutral position out of contact with either of the ramp surfaces of the outer race, a position to which it is moved whenever the solenoid is energized.

In the four-wheel drive mechanism, according to this invention, the nondriven wheels, which by way of example are the rear wheels of the vehicle, cannot drive the front wheels, the normally driven wheel set, when the vehicle is driven rearward following forward drive. When the shift mechanism is moved from the forward drive to reverse drive position, the drag force that normally tends to move the clutch rollers into contact with the ramp surfaces of the outer race is removed because the solenoid is energized. The cage is biased to a neutral position by opposed compression springs. Therefore, whenever the shift selector is moved to the neutral position, the cage-roller assembly of the clutch means moves to a neutral position out of engagement with either of the ramp surfaces formed on the inner race of the clutch.

BRIEF DESCRIPTION OF THE DRAWING

FIG. 2 is a cross section through the plane containing the axes of the rear driveshaft and rear axleshafts showing the components of the rear drive clutch mechanism.

FIG. 3C shows the clutch components in the neutral position they assume when the solenoid pin disengages the ground connector.

FIG. 4 is a partial cross section taken at plane IV—IV of FIG. 2.

FIG. 5 is a diagram that shows the electrical circuit through which the solenoid is energized through operation of the gear selector of an automotive vehicle.

DESCRIPTION OF THE PREFERRED EMBODIMENT

Figure 1:
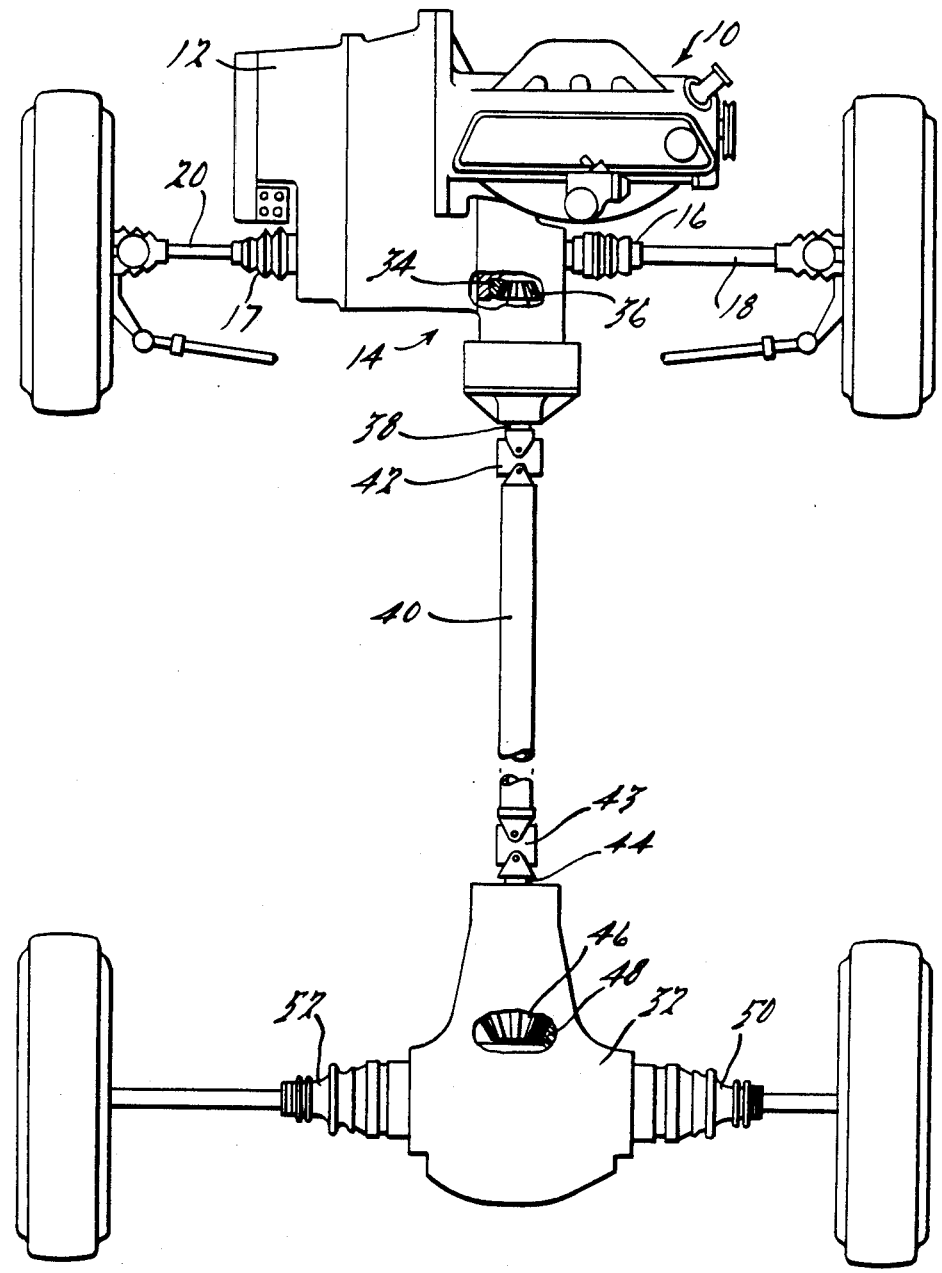
FIG. 1 is a plan view showing the power transmitting components of a vehicle driveline for use with this invention.

Referring first to FIG. 1, a transversely mounted engine 10 is driveably connected to an automatic or manually operated transmission 12 whose output is connected through a differential mechanism 14 and inner constant velocity joints 16, 18 to the front axle 18, 20 of a vehicle. The final drive mechanism of the transmission includes a rotatably mounted differential casing driveably connected to the output shaft of the transmission having a differential spindle, bevel pinions rotatably mounted on the spindle, and side bevel gears intermeshing with the bevel pinions and fixed rigidly to the axleshafts 18, 20. Differential 14 includes bevel pinion 34 in mesh with bevel pinion 36, which is formed integrally with a driveshaft that extends rearward from the front axle toward the rear axleshafts. The rear driveshaft 40 is connected by a universal joint 42 to a driveshaft 38 at the front end, and by universal joint 43 at the rear end to driveshaft 44. Shaft 44 is formed integrally with a bevel pinion 46, which is in continuously meshing engagement with a bevel gear 48 adapted to rotate about the axis of the rear axle shafts 50, 52. Gears 34, 36, 46 and 48 are sized such that the gear ratio produced by them causes gear 48 to be driven five to ten percent slower than the speed of the front axleshafts 18, 20 when the vehicle is traveling straight ahead and there is no slippage of the wheels.

Referring now to FIG. 2, the rear drive mechanism of the four-wheel drive system, according to the present invention, includes a housing 54 in which bearings that support the rear driveshaft 44 and bearings 60 and 62 that support the right and left rear axleshafts 50, 52 are fitted. Bearing adjustment nuts 64 and 66 engage threads formed in housing 54 and bear against the outer races of bearings 60, 62. In this way they are used to adjust the axial position of the bearings relative to the axis of driveshaft 44 and to control the degree of meshing engagement of pinion 46 with gear 48.

Bevel gear 48 is connected to the outer race 68 of an overrunning clutch 70 by means of which power is transmitted to the rear axleshafts from driveshaft 44. Each of the rear axleshafts has a splined portion 72, 74 that is driveably connected through the spline to the inner races 76, 78 of the overrunning clutch 70. First and second sets of clutch rollers 80, 82 are located between the outer surfaces of the inner races and the inner surface of the outer race on which multiple cammed surfaces are formed. The sets of clutch rollers are located within first and second sets of apertures 87 (seen best in FIG. 3) formed in the surface of the cage 88. Extending axially outward from the race are multiple springs arms 86 that are biased radially inward from their undeflected positions into contact with a surface of a ground connector 90 that is selectively connectable to and disconnectable from the casing 54. Connector 90 is carried on a surface of an end cover 92 that is bolted to the outer race 68. The outer surface of ground connector 90 is formed with teeth 94 between which the stem 100 of an electrical solenoid 96 is biased by a compression spring 98 when the winding of solenoid 96 is not energized. The solenoid is energized from a source of electrical power through feedlines 102 provided the shift selector of the transmission is moved to the neutral position.

A plug 104 is connected by a screw thread to the transmission casing in an area where the transmission fluid within the casing can flow over the interior surface of the plug. The plug is equipped with a permanent magnet by means of which metal particles carried by the transmission fluid become fixed to the plug.

Figure 3A:
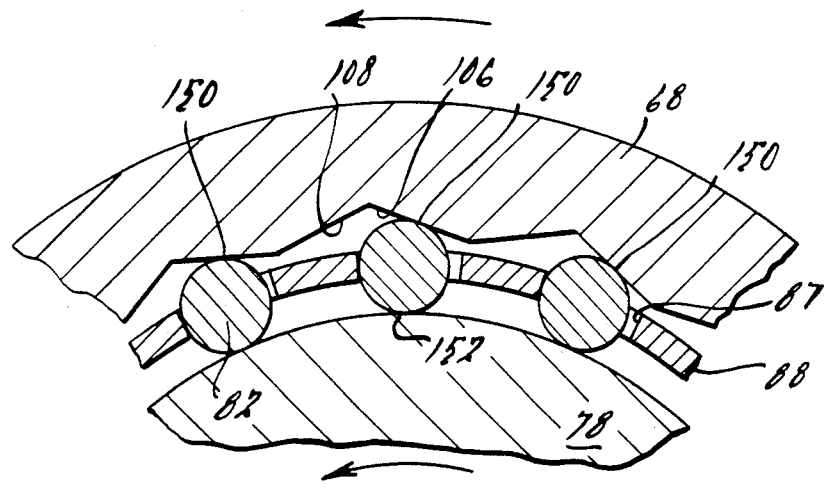
FIG. 3a is a cross section taken at plane III—III of FIG. 2 showing the rollers in contact with the surfaces of the clutch races in the forward drive position.
Figure 3B:
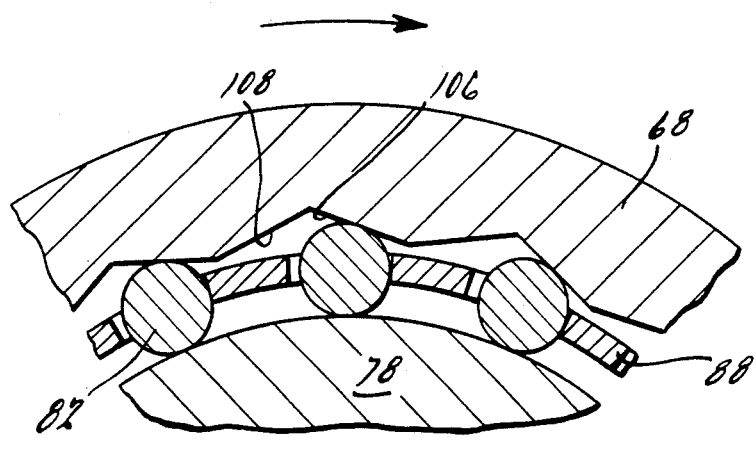
FIG. 3B is a cross section taken similar to that of FIG. 3A but showing the components of the clutch in position for reverse drive.

Referring now to FIG. 3, a cross section through the outer race, inner race and cage assembly shows that the inner surface of the outer race is formed with multiple ramp surfaces 106, 108 formed in pairs, on which each roller 80, 82 makes contact. The apertures of the cage are larger than the diameter of the rollers so that the cage can rotate with respect to the rollers between the position shown in FIG. 3A, where the cage contacts the rollers and forces them into contact with the trailing ramp surface 106 of the outer race, and the position shown in FIG. 3C, where the cage allows the rollers to move away from the ramp surfaces. FIG. 3A shows the position of various members of the overrunning clutch when the clutch is disposed to transmit power from the outer race 68 to the inner race 76, 78.

As bevel gear 48 rotates, it is wetted by passing through a bath of hydraulic lubricant contained in the housing, and centrifugal force causes the lubricant clinging to the surface of the gear to be thrown radially outward. Formed in the casing are several lubricant ports 110 and 112, which carry lubricant from the radially outer regions adjacent to the bevel gear and pinion 46, 48 radially inward toward chambers 114, 116, which are provided with oil seals at the axially outer ends thereof. Fitted between the inner surface of the bearing adjustment nuts 64, 66 and the outer races of bearings 60, 62 are disks 118, 120 which act as baffles to prevent the free flow of lubricant from chambers 114, 116 through the bearings. The baffles allow lubricant to flow into recesses 122, 124 formed in the axleshafts, and these recesses communicate with helical slots 126, 128 formed in a slotted portion of the axleshafts and extend axially between recesses 122 and an inner recess 124. Lubricant is pumped in the helical slots 126, 128 from recesses 122 to recess 124 when the axleshafts rotate in the direction indicated by vectors A and B, which indicate the direction of forward motion of the vehicle. Oil flows from recess 124, to a center chamber 130 through the splines formed on portions 72, 74 of the axleshafts in a space provided for the oil flow by intentionally leaving one or more teeth of the splines missing for this purpose. Centrifugal force carries the oil radially outward between the adjacent faces of the inner races 76, 78 from recesses 124, 126 through clearance spaces located between the outer surface of the inner races 76, 78 and the inner surface of bevel gear 48. Similarly passage 140 carries fluid from recess 126 to the face of ground connector 90.

Oil flows from chamber 114 around the inner edge of baffle disk 118 and through bearing 60 as well as being pumped from recess 122 to recess 124. Oil that flows through bearing 60 is prevented by baffles 132 and 134 from being thrown radially outward by centrifugal force. Baffle 132 is bolted to the inner end of bearing adjustment nut 64 and baffle 134 is bolted to the axially outer surface of gear 48. These baffles overlap but provide a clearance space between them that allows at least a portion of the oil that passes through bearing 60 to flow between the baffles outward toward the entrance to passage 110. However, a major portion of the oil that passes through bearing 60 is directed by the undersurface of the baffles through passage 136 and through the spaces between the roller-cage assembly. Similarly, the oil in chamber 130 which passed through the spline portions 72, 74 and between the adjacent axial faces of the inner races 76, 78 flows outward axially through the cage-roller assembly and through opening 138 formed in the ground connector. Oil flowing through passage 138 wets the inner surface of the ground connector 90, particularly the surface on which springs 86 make contact, and keeps the inner surface lubricated. Centrifugal force then carries lubricant radially outward into the area where the fluid can re-enter the passage 112 and recirculate through the clutch.

The helical recesses 126, 128 formed on the first and second rear axleshafts are approximately 0.030 inches wide and between 0.020 and 0.030 inches deep. This size has been found sufficient to carry fluid at a preferred flow rate through the interior regions of the clutch.

In operation with the vehicle traveling forward and straight ahead, the relative position of the outer race 78, roller 82, cage 88, its apertures 87, and the inner race 78 is shown in FIG. 3A. In this driving condition, the inner race is rotating faster than the outer race due to the driveline gear ratio between the front axleshaft and rear differential. Solenoid 96 connects the ground connector 90 to the casing when the winding of the solenoid is not energized, because then compression spring 98 biases pin 102 between the teeth 94 of the ground connector. Spring arms 86 of the cage 88 produce a drag force due to their contact with the nonrotating ground connector. This force causes the cage to make light contact on one side of rollers 82 and in this way to hold the rollers in contact with the outer race at 150 and in contact with the inner race at 152. However, because the inner race is rotating faster than the outer race, there is no power transmitted through the clutch although the roller is held in contact with the surface of the races. Power would be transmitted between the outer race and inner races if the speed of the outer race were increased relative to that of the inner race. For example, if the front wheels should slip on the road surface, the speed of the outer race can increase to the speed of the inner races 76, 78, to which the rear axleshafts are connected. When this occurs, power is transmitted from the outer race through the rollers to the inner races and to the rear axleshafts. Similarly, when the vehicle is turning, if the front drive wheels should slip on the road surface, power is transmitted to the inner rear wheel when the speed of the outer race equals the speed of the inner race that is associated with the inner rear wheel.

If the vehicle were stopped after driving forward and the rollers were not forced away from the ramp surfaces, the elements of the clutch would be in the position shown in FIG. 3A. Then, if the vehicle were driven backward, the elements of the clutch would be located as in FIG. 3B. The inner race would transmit power to the outer race; consequently, the front wheels would be driven faster than the rear wheels because the gear ratio of the bevel pinion-gear system is such that the outer race of the clutch turns slower than the inner race when the front and rear wheels turn at the same speed. Therefore, when the inner race drives the outer race, the front wheels will scrub on the road surface because they are driven at a faster rotational speed than the speed of the rear wheels.

In order to avoid this problem, the drive mechanism according to the present invention includes two compression springs 154, 156, each contacting opposite facing surfaces of apertures 158 formed in bevel gear wheel 48 at angularly spaced locations, for example, at diametrically opposite sides of the rear axleshaft axis. In this way, when there is no drag force on the cage, as is normally produced by the sliding action of the spring elements 86 of the cage against the surface of the ground connector 90, the springs 154, 156 bias the race to the neutral position shown in FIG. 3C where the rollers are moved away from the inclined ramp surfaces formed on the inner surface of the outer race 68. The frictional force resulting from the contact of the spring elements 86 in contact with the ground connector tends to oppose the biasing action of the springs 154, 156 to the neutral position. However as FIG. 5 shows, the solenoid is energized whenever the shift indicator is placed in the neutral position as it would be in an automatic transmission or a manual transmission when gear ratio changes are made from a forward drive to a reverse drive position. When the solenoid is energized, the ground connector is disconnected from engagement with the casing of the drive mechanism. Therefore, the ground connector is free to rotate so that there is no drag load in this condition on the cage tending to oppose the action of springs 154, 156 and the cage is therefore able to be moved by these springs to the neutral position.

Having described a preferred embodiment of my invention, what I claim and desire to secure by U.S. Letters Patent is:

1. An axle drive mechanism comprising:
   a rotatable outer race having multiple sets of ramp surfaces;
   first and second inner races located within the outer race coaxially mounted for independent rotation;
   first and second sets of rollers mounted for rotation on the inner races and for movement in either circumferential direction relative to the ramp surfaces of the outer race between a released position where the rollers are out of contact with the ramp surfaces and a drive position where the rollers are wedges between a set of ramp surfaces and the surface of the inner race;
   cage means in which the first and second sets of rollers are retained, rotatable relative to the inner and outer races, for moving the rollers circumferentially relative to the inner and outer races;
   a nonrotating member;
   drag means slidably connecting the cage means to the nonrotating member for urging the rollers to a drive position due to frictional contact between the cage means and the nonrotating member;
   means for selectively connecting and disconnecting the drag means and the nonrotating member;

means for biasing the rollers to the released position;

a ground connector mounted for rotation about the axes of the inner and outer races relative to the cage means and the inner and outer races, wherein the cage means is resiliently biased into sliding frictional contact with the ground connector, and wherein the connecting and disconnecting means connects the ground connector to the nonrotating member and disconnects the ground connector from the nonrotating member;

a source of electrical power;

an electrical solenoid mounted on the casing having a pin biased into engagement with the ground connector adapted to retract the pin from said engagement when the solenoid is energized;

switch means for connecting and disconnecting the power source and the solenoid, wherein the switch means includes a gear selector controlled by the vehicle operator having forward drive and reverse drive positions adapted to connect the power source to the solenoid whenever the gear selector is moved between the forward drive and reverse drive positions and to disconnect the power source from the solenoid whenever the gear selector is located in a forward drive position or a reverse drive position.

* * * * *